United States Patent
Niyada

Patent Number: 5,241,649
Date of Patent: Aug. 31, 1993

[54] VOICE RECOGNITION METHOD

[75] Inventor: Katsuyuki Niyada, Sagamihara, Japan

[73] Assignee: Matsushita Electric Industrial Co., Ltd., Kadoma, Japan

[21] Appl. No.: 628,987

[22] Filed: Dec. 17, 1990

Related U.S. Application Data

[63] Continuation of Ser. No. 370,081, Jun. 21, 1989, abandoned, which is a continuation of Ser. No. 830,690, Feb. 18, 1986, abandoned.

[30] Foreign Application Priority Data

Feb. 18, 1985 [JP] Japan .................... 60-29547
Nov. 8, 1985 [JP] Japan .................... 60-251360

[51] Int. Cl.$^5$ .................... G10L 9/00
[52] U.S. Cl. .................... 395/2; 381/42
[58] Field of Search .................... 364/513.5; 381/41–50; 395/2

[56] References Cited

U.S. PATENT DOCUMENTS

| | | | |
|---|---|---|---|
| 3,816,722 | 6/1974 | Sakoe et al. | 381/42 |
| 4,032,710 | 6/1977 | Martin et al. | 381/41 |
| 4,032,711 | 6/1977 | Sambur | 381/42 |
| 4,319,221 | 3/1982 | Sakoe | 381/43 |
| 4,400,788 | 8/1983 | Myers et al. | 381/43 |
| 4,489,435 | 12/1984 | Moshier | 381/43 |
| 4,555,796 | 11/1985 | Sakoe | 381/43 |
| 4,570,232 | 2/1986 | Shikano | 381/43 |
| 4,592,085 | 5/1986 | Watari et al. | 381/43 |
| 4,677,672 | 6/1987 | Ukita et al. | 364/513.5 |
| 4,677,673 | 6/1987 | Ukita et al. | 381/43 |
| 4,712,242 | 12/1987 | Rajasekaran et al. | 381/42 |

OTHER PUBLICATIONS

Lamel et al., "An Improved Endpoint Detector for Isolated Word Recognition", IEEE Trans. on ASSP, vol. ASSP-29, No. 4, Aug. 1981.

Furui, "Cepstral Analysis Technique for Automatic Speaker Verification", IEEE Trans. on ASSP, vol. ASSP-29, No. 2, Apr. 1981.

Bourlard, Kamp, Wellekens, "Speaker Dependent Connected Speech Recognition via Phonemic Markov Models", IEEE International Conference on ASSP, ICASSP 85, Mar. 26–29, 1985, pp. 1213–1216.

Primary Examiner—David D. Knepper
Attorney, Agent, or Firm—Spencer, Frank & Schneider

[57] ABSTRACT

In a voice recognition method, a d-by-J dimensioned reference voice pattern is prepared for each target word, when J denotes a predetermined number of frames and d denotes a predetermined number of characterizing parameters per frame. A spoken input word is partitioned between its start and end points into J frames, and d characteristic parameters are extracted for each frame to form a d-by-J dimensioned input time-series vector. The resemblance between the input vector and each of the reference voice patterns is then calculated using a statistical distance scale, and the spoken word is identified with the reference pattern providing the highest resemblance. The method requires fewer calculations and yet attains a high recognition rate through the normalization of the input voice word for both spectrum and time.

31 Claims, 8 Drawing Sheets (ACCURATE START POINT)(ACCURATE END POINT)

VOICE RECOGNITION METHOD

This application is a continuation of application Ser. No. 07/370,081, filed Jun. 21st, 1989, which was a continuation of application Ser. No. 06/830,690, filed Feb. 18th, 1986 now abandoned.

BACKGROUND OF THE INVENTION

1. Field of the Invention

This invention relates to a voice recognition method for identifying spoken words by machine.

2. Description of the Prior Art

Voice recognition technology has been advanced and systems have been marketed in recent years. However, most apparatus have been oriented to voice recognition for specific persons whose voices have been recorded in advance. Such person-oriented apparatus requires tedious preparatory operations for registering the voice words to be identified and this is an enormous job for the user except when the apparatus is used continuously on a long term basis. Therefore, more recently, voice recognition techniques which do not need voice registration and are easily applicable to general (that is, unspecified) persons are under intensive study.

Voice recognition, in a general sense, is performed by pattern matching between an input voice word and reference voice words stored in the form of parameters in dictionary form and by identifying the voice word with the highest resemblance as the recognition result. If an input voice word were to match completely with one of the stored voice words in a physical sense, no technical problem would arise, but in reality spoken utterances of the same word are not completely identical due to the dependence on the persons who speak the word and also on the manner of speaking.

Differences arising in a spoken word depending on the persons and the speaking manner are represented physically by vectorial features on the time axis. Namely, different shapes of the voice-making organs (i.e., mouth, tongue, throat, etc.) among persons cause differences in the sound spectrum for the same word depending on each person. The spectral features on the time axis also differ depending on whether a word is spoken fast or slowly.

The voice recognition technique oriented to general persons is designed to normalize the input voice spectrum and its variation on the time axis prior to the comparison process with the reference patterns. Conventional methods use the nonlinear matching method (DP method) for the vector normalizing process. There is known, as an example, a matching method in which the DP method is applied to both of the vectorial and time analyses (Miwa, et al., "Plurality word voice recognition oriented to general persons based on preselection and spectral matching", proceedings of Japan Acoustics Society, Voice Study Group, S83-20, 1983-6). This prior art technique will be described as an example of the prior art in the following.

An input voice word is analyzed for each frame (10 ms) by 29-channel filters, which produce Zk (k=1, 2, ..., N; N=29). Reference spectra $r_i$ (i=1, 2, ..., 29) are given. It is assumed that the frequency variation is within the range from channel K1 to K2.

In nonlinear spectrum matching, the distance $\underline{d}$ between an input spectrum and a reference spectrum is given by expression (1).

$$d = \min_{k_s \in \mathbf{lk}} \left( \min_{k_e \; k_e \in \mathbf{lk}} (d_{k_s, k_e}) \right) \quad (1)$$

where $k_s$ and $k_e$ represent the start point and end point of the voice word, respectively. In expression (1), $$K = \{k_1, k_1+1, \ldots, k_2-1, k_2\}$$

$$d_{k_s, k_e} = p(N-[k_e], N-[-k_s])/(N-|k_s|+N-|k_e|) \quad (2)$$

The ramp function [ ] is defined as follows.

$$[k] = \begin{cases} k & (k > o) \\ o & (k \leq o) \end{cases}$$

The denominator of equation (2) is the normalized terms of the path in nonlinear spectral matching, while the numerator is the value at the end point of the objective function calculated by the following recurrence formula.

$$p(i,j) = \min \begin{cases} p(i-1,j) + q(i,j) \\ p(i-1,j-1) + 2q(i,j) \\ p(i,j-1) + q(i,j) \end{cases} \quad (3)$$

$$q(i,j) = |z_j - r_i| \quad (4)$$

In the word matching process, the inter-word distance $\underline{w}$ is calculated using the inter-spectrum distance $\underline{d}$ obtained from expression (1). The inter-word distance is also calculated using the DP method so as to cope with the variation in the speaking speed.

$$w = h(I, J)/(I+J) \quad (5)$$

where I and J represent the durations of the reference pattern and input pattern, respectively, expressed as the number of frames. The term h(i, j) in equation (5) is calculated by the following recurrence formula.

$$h(i,j) = \min \begin{cases} h(i-1,j-2) + 2d(i,j-1) + d(i,j) \\ h(i-1,j-1) + 2d(i,j) \\ h(i-2,j-1) + 2d(i-1,j) + d(i,j) \end{cases} \quad (6)$$

where $\underline{i}$ and $\underline{j}$ represent the frame numbers of the reference pattern and input pattern, respectively.

A word in the dictionary which makes the value w in equation (5) a minimum is extracted as a result of the recognition process. This conventional technique implements normalization using formula (3) against the spectral variation and formula (6) against the variation on the time axis.

Accordingly, the conventional method is based on a double use of the DP method. The DP method involves many calculating operations even for the time axis direction (formula (6)) only, and if it is further used for the frequency direction (formula (3)), the number of calculating operations will become enormous.

SUMMARY OF THE INVENTION

The present invention solves the foregoing problem, and its prime object is to achieve a high recognition rate for voice words spoken by unspecified persons through the normalization for both spectrum and time by fewer calculating operations.

Another object of this invention is to provide a voice recognition method achieving a high recognition rate, in which a spoken word is extracted from an input signal automatically without the need of operations for detecting the range of a voice word.

Still another object of this invention is to provide a voice recognition method which is operable at a high processing speed and which has a high recognition rate in a noisy environment.

According to one aspect of this invention, the duration of a voice word or spoken word from the start point to the end point detected from an input voice signal is partitioned into a certain number (I) of frames so as to adjust the word length, characteristic parameters ($d$ in number) are determined for each frame to form an input pattern of D dimensions ($D=d \times I$), and the distance between the input pattern and a reference pattern is calculated using a statistical distance scale, with the intention of absorbing the spectral variation and time variation in fewer calculating operations, whereby words spoken by unspecified persons can be recognized efficiently.

According to another aspect of this invention, a sufficiently long input signal range is established which includes a section with a spoken word which is to be recognized and sections with noise preceding and following the word section. A reference time point is set in the input signal range, and two ranges are set to have N1 frames and N2 frames (N1<N2) counted from the reference point. These ranges are assumed to correspond to the minimum and maximum acceptable word lengths. Reference word patterns are test-matched against the input signal for candidate voice ranges that are N2−N1+1 in number while the voice range is adjusted to a constant length so as to determine the similarity (or distance) between the input and a reference word, this operation being repeated by moving the reference point from the beginning to the end of the input signal range. The similarity (or distance) data for all reference points and for all candidate voice ranges are compared for all reference words, and the word providing the maximum resemblance (or minimum distance) is extracted as the voice recognition result.

According to still another aspect of this invention, a candidate starting range (frame k1) and candidate ending range (frame k2) are determined for an input voice word so as to establish voice ranges that are k1 by k2 in number by combining all starting points and ending points for the candidate ranges. Characteristic data for each voice range is normalized to a constant time length so as to permit a determination of the resemblance (or distance) with respect to a reference pattern, this operation being repeated to calculate the resemblance (or distance) data in the entire voice range for the reference patterns of all words. The word providing the maximum resemblance (or minimum distance) is extracted on a comparison basis as the result of voice recognition. During this process, the multiplying operations between the frames of a reference pattern and the corresponding input frames needed for calculation of the resemblance or distance are carried out in advance, and resultant values are selectively used as addends in the resemblance or distance calculation with the intention of avoiding duplicated multiplying operations, whereby the calculating operations necessary for evaluating the resemblance or distance are reduced.

DESCRIPTION OF THE PREFERRED EMBODIMENTS

Figure 1:
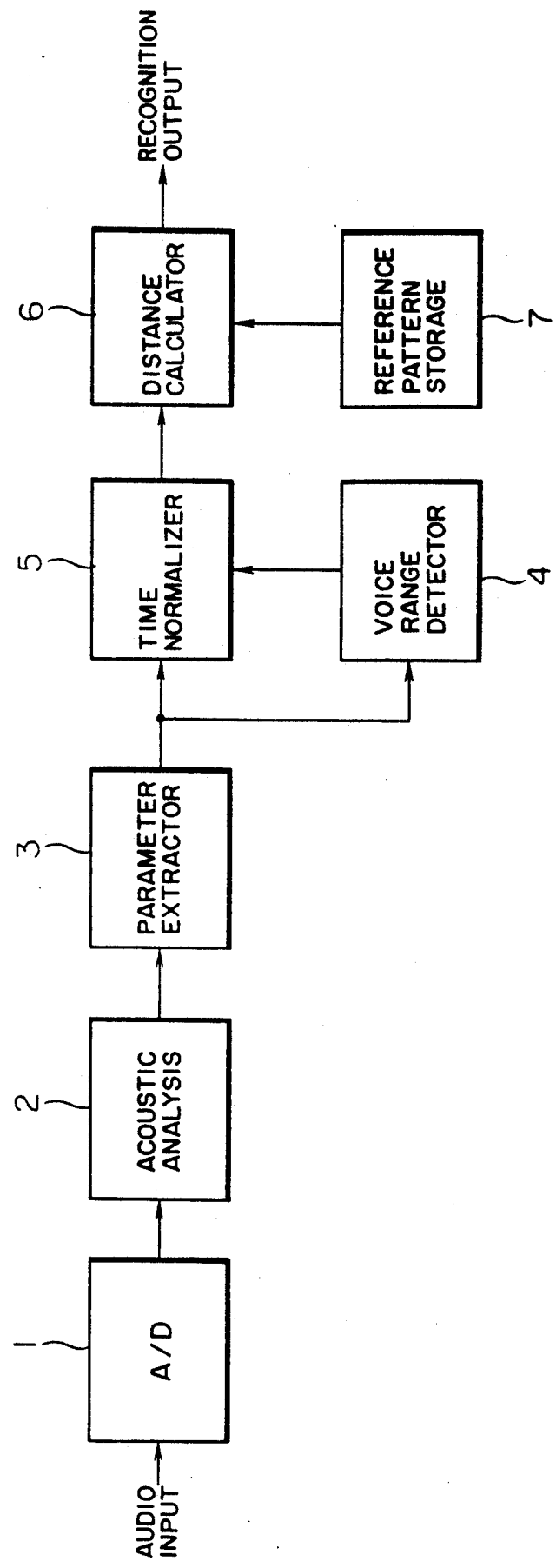
FIG. 1 is a functional block diagram of a first embodiment of the voice recognition method of the present invention.

FIG. 1 is a functional block diagram showing the first embodiment of the inventive voice recognition method. The system includes an A/D converter 1 for converting an input audio signal into a digital signal, an acoustic analyzer 2 for analyzing each analysis range (frame) to produce spectral information, a characteristic parameter extractor 3 for determining characteristic parameters, a voice range detector 4 for detecting a starting frame and ending frame, a time axis normalizer 5 for adjusting the duration of an input voice word, a distance calculator 6 for calculating the distance between an input pattern and a reference pattern, and a reference pattern storage 7 for storing reference patterns which have been produced in advance.

The operation of the foregoing arrangement will be described in the following. An input audio signal is formed into a 12-bit digital signal by the A/D converter 1, which operates at a sampling frequency of 8 kHz. The acoustic analyzer 2 implements LPC analysis for each frame (10 ms) of the digitalized signal by the autocorrelation method. The analysis is of the order of ten, determining the linear predictive coefficients a0, a1, a2, ..., a10, and also the voice power $w_o$ for each frame. The characteristic parameter extractor 3 uses the linear predictive coefficients to determine the LPC cepstrum coefficients $C_1$-$C_p$ (p is the order of truncation) and the normalization logarithmic residual power Co. The LPC analysis and the method of extracting the LPC cepstrum coefficients are described in detail in, for example, the publication entitled "Linear Prediction of Voice" by J. D. Merkel and A. H. Grey, and they are not explained in this specification. The characteristic parameter extractor 3 determines the logarithmic power $LW_o$ by the following equation.

$$LW_o = 10 \log_{10} w_o \qquad (7)$$

The voice range detector 4 compares the logarithmic power $LW_o$ obtained by equation (7) with a threshold value $\Theta_s$ and determines the first encountered frame with a logarithmic power exceeding the threshold to be the starting frame $F_s$ of the voice range if frames with $LW_o > \Theta_s$ continue for more in number than $l_s$. Following the determination of the starting frame $F_s$, the detector 4 compares the logarithmic power $LW_o$ with a threshold value $\Theta_e$ and determines the first encountered frame with a logarithmic power less than this threshold to be the ending frame $F_e$ if frames with $LW_o < \Theta_e$ continue for more in number than $l_e$. In this way the duration from $F_s$ to $F_e$ is determined as the voice range of the spoken word. For simplifying the following explanation, the frames can now be renumbered as 1, 2, . . . , n, . . . , N, with the starting frame $F_s$ being the first frame.

The time axis normalizer 5 divides the word length into I frames so as to linearly adjust the word length, so that the i-th frame after adjustment and the n-th frame of the input voice signal have the relationship specified in expression (8).

$$n = \left[ \frac{N-1}{I-1} i + \frac{I-N}{I-1} + 0.5 \right] \qquad (8)$$

where the symbols [ ] express the largest integer which does not exceed the enclosed value. In this embodiment, I is set to 16.

Subsequently, the normalizer 5 aligns the length-adjusted characteristic parameters along the time axis to form a time-series pattern $\mathfrak{C}_x$. Supposing the characteristic parameters (the LPC cepstrum coefficients) of the i-th frame to be $$C_{i,k}^{(x)}$$

(k=0, 1, 2, . . . , p; D in number), then $\mathfrak{C}_x$ is expressed as follows.

$$\mathfrak{C}_x = (C_{i,0}^{(x)}, C_{i,1}^{(x)}, C_{i,2}^{(x)}, \ldots, C_{i,p}^{(x)}, \ldots, \qquad (9)$$

$$C_{i,0}^{(x)}, C_{i,1}^{(x)}, \ldots, C_{I,0}^{(x)}, C_{I,1}^{(x)}, \ldots, C_{I,p}^{(x)})$$

Namely, the time-series pattern $\mathfrak{C}_x$ is a vector of $I \cdot (p+1)$, i.e., $I \cdot D$ dimensions (D is the number of parameters in a frame).

The distance calculator 6 calculates the distance between the input pattern $\mathfrak{C}_x$ and reference patterns of voice words stored in the reference pattern storage 7 using a statistical distance scale, and extracts the word which provides the minimum distance as the voice recognition result.

Supposing the reference pattern corresponding to the k-th voice word stored in the reference pattern storage to be $\mathfrak{C}_k$ (average value) and the covariance matrix common to all target voice words to be $\mathbb{W}$, the Mahalanobis' distance $R_k$ between the input pattern $\mathfrak{C}_x$ and the k-th reference pattern $\mathfrak{C}_k$ is calculated as follows.

$$R_k = (\mathfrak{C}_x - \mathfrak{C}_k)^t \cdot \mathbb{W}^{-1} \cdot (\mathfrak{C}_x - \mathfrak{C}_k) \qquad (10)$$

In the above formula, the suffix t indicates transposition, and $-1$ signifies an inverse matrix. Expanding the formula (10) to eliminate terms unrelated to k gives $L_k$, and it can be calculated as follows.

$$L_k = b_k - \mathbf{a}_k^t \cdot \mathfrak{C}_x \qquad (11)$$

where $$\mathbf{a}_k = 2 \cdot \mathbb{W}^{-1} \cdot \mathfrak{C}_k \qquad (12)$$

$$b_k = \mathfrak{C}_k^t \cdot \mathbb{W}^{-1} \cdot \mathfrak{C}_k \qquad (13)$$

Calculating $L_k$ for all k (k=1, 2, . . . , K), the voice word providing the minimum distance $L_k$ is found to be the recognition result. K is the number of reference patterns of voice words stored in the reference pattern storage 7. Actually, each reference pattern consists of $\mathbf{a}_k$ and $b_k$ in pairs, and such pairs equal in number to the voice words (K) are stored.

Calculation of equation (11) needs multiplication by $I \cdot (p+1)$ times and subtraction once. Substituting I=16 and p=4 for this embodiment, the number of multiplying operation is 80, which is incomparably less than the conventional method equations 3 and 6).

Next, the generation of reference patterns $\mathfrak{C}_k$ and the associated covariance matrix $\mathbb{W}$ (actually converted to $\mathbf{a}_k$ and $b_k$) will be described. Reference patterns are produced using numerous data samples for each voice word. The number of samples used for each voice word is M. By application of equation (8) to each sample, the number of frames is adjusted to I. The average vector for the voice word k is calculated as follows.

$$\mathfrak{C}_k = C_{1,0}^{(k)}, C_{1,1}^{(k)}, C_{1,2}^{(k)}, \ldots, C_{1,p}^{(k)}, \ldots, \qquad (14)$$

$$C_{i,0}^{(k)}, C_{i,1}^{(k)}, \ldots, C_{I,0}^{(k)}, C_{I,1}^{(k)}, \ldots, C_{I,p}^{(k)}$$

where $C_{i,d}^{(k)} = \frac{1}{M} \sum_{m=1}^{M} C_{i,d,m}^{(k)} \qquad (15)$ (i=1, 2, . . . , I: I frames; d=0, 1, 2, . . . , p: D parameters)

$$C_{i,d,m}^{(k)}$$

represents the m-th sample for a voice word k, and it is a set of cepstrum coefficients of the order of d for the i-th frame. In a similar procedure to the case of the average vector, the covariance matrix $\mathbb{W}^{(k)}$ of the voice word k is calculated. The covariance matrix $\mathbb{W}$ common to all voice words is calculated as follows.

$$\mathbb{W} = 1/K \ (\mathbb{W}^{(1)} + \mathbb{W}^{(2)} + \ldots + \mathbb{W}^{(k)} + \ldots + \mathbb{W}^{(K)}) \qquad (16)$$

The time-series pattern $\mathfrak{C}_k$ and the covariance matrix $\mathbb{W}$ are converted to $\mathbf{a}_k$ and $b_k$ using equations (12) and (13), and this set is stored in the reference pattern storage 7 in advance.

For establishing the effectiveness of this embodiment, an experiment was conducted using the ten Japanese numeral words (read phonetically as "Ichi", "Ni", "San", "Shi", "Go", "Roku", "Shichi", "Hachi", "Kyu", and "Zero" to be spoken by adult men and women).

The following table lists the average recognition rate of all speakers and all words for the different truncation orders p of the LPC cepstrum coefficients (the number of parameters: D=p+1).

TABLE

| | 1 | 2 | 3 | 4 | 5 | 6 | 7 | 8 | 9 | 10 |
|---|---|---|---|---|---|---|---|---|---|---|
| Average recognition rate | 85.5 | 92.0 | 94.5 | 98.5 | 97.0 | 97.5 | 96.0 | 97.0 | 95.5 | 96.0 |

The table shows that the recognition rate reaches a peak at p=4 and does not change significantly at larger values of p. Accordingly, the value of p is set optimally to 4, which also minimizes the number of calculations with regard to the statistical distance scale. The average recognition rate in this condition is as high as 98.5% and the number of calculating operations for recognizing one word is as extremely small as 800 multiplications and ten subtractions, so the effectiveness of this embodiment is obvious.

Although in the above description equation 11) is used as a statistical distance scale, it is possible to replace it with other statistical distance scales such as the Bayes' discriminant and the linear discriminant function. When the Bayes' discriminant is used, the logarithmic likehood $L_k$ is calculated as follows.

$$L_k = -(\mathbb{C}_x - \mathbb{C}_k)^t |W_k|^{-1} \cdot \mathbb{C}_x - \mathbb{C}_k) - A_k \quad (17)$$

$$A_k = 2 \cdot \log\left( (2\pi)^{\frac{p+1}{2}} \cdot |W_k|^{\frac{1}{2}} \right) \quad (18)$$

Then, the voice word in the reference pattern storage 7 providing the maximum value for equation (17) is extracted.

The characteristic parameter may be other than LPC cepstrum coefficients, e.g., the output of a band-pass filter, PARCOR coefficients, autocorrelation coefficients, or a modified version of them.

This embodiment can be summarized as follows. The period of a spoken or input voice word between a detected start point and a detected end point is divided into frames of constant number I so as to adjust the word length. Characteristic parameters, D in number, are calculated for each frame so as to form an input pattern of D-by-I dimension. The distances between the input pattern and reference voice word patterns are calculated using a statistical distance scale, and the word whose reference pattern provides the smallest distance or the highest resemblance is selected as the voice recognition result. Variations in the voice spectrum and its variation on the time axis, which have previously been barriers to voice recognition oriented to unspecified persons, are transformed into variations in the characteristic parameters and their variation on the time axis. These variations are taken in reference patterns as statistical values on the assumption that the variation mode complies with a multi-dimensional normal distribution. On this account, a displacement of spectrums between an unknown input and the reference patterns and a displacement of frames caused by time axis normalization can be absorbed, provided that they are within the allowable range statistically.

In addition, the spectral variation and time variation are not separated in this embodiment, but they are dealt with on the same level (i.e., treated as a time-series pattern of characteristic parameters). This allows a reduction in the number of calculating operations, and voice words spoken by unspecified persons can be recognized with fewer calculations and yet at high accuracy.

Figure 2:
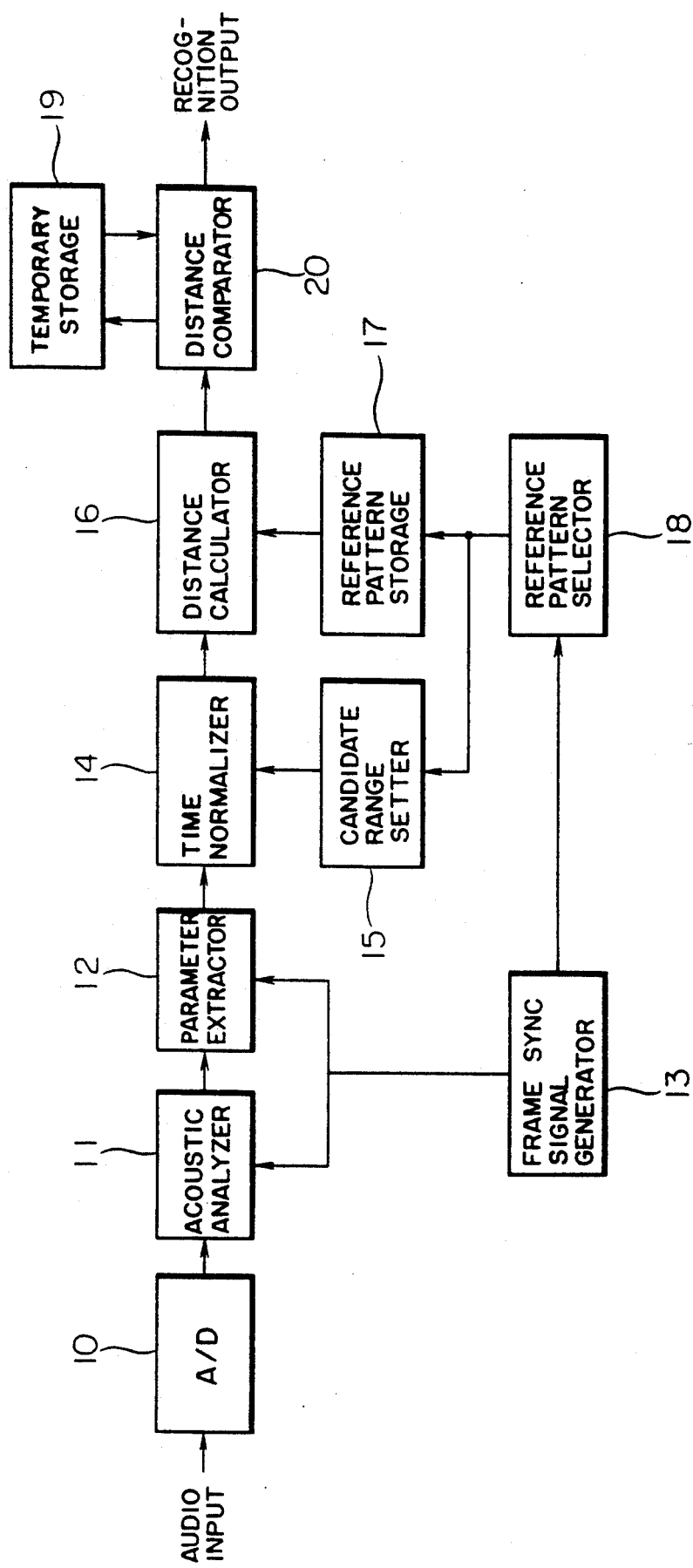
FIG. 2 is a functional block diagram of a second embodiment of the inventive voice recognition method.

FIG. 2 is a functional block diagram embodying a second embodiment of the inventive voice recognition method. The idea of this embodiment will first be described in connection with FIGS. 3, 4 and 5. The duration of the same spoken word differs depending on the speaking manner and also on each person. In a voice recognition method based on pattern matching, the duration of an input voice word is normalized to a standard length, and a resemblance calculation or a distance calculation is conducted to identify the word.

Figure 3:
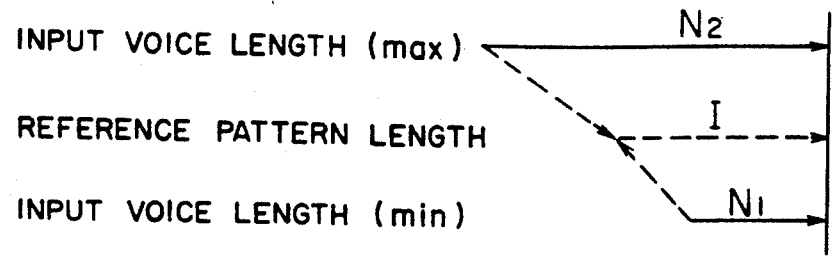
FIGS. 3, 4 and 5 are diagrams used to explain the adjustment of the voice range length according to the second embodiment.

FIG. 3 shows the normalization of voice word durations. For input voice words ranging from a minimum length N1 to a maximum length N2, and for a standard voice word length (reference pattern length) I, a voice word with length N (N1≦N≦N2) is normalized by expansion or shortening to the length of I as shown in FIG. 3. In the figure, the voice word lengths are adjusted with their ending points coincident with each other. The length adjustment process employs the same formula as has been given as formula (8).

$$n = \left[ \frac{N-1}{I-1} i + \frac{I-N}{I-1} + 0.5 \right] \quad (19)$$

Figure 4:
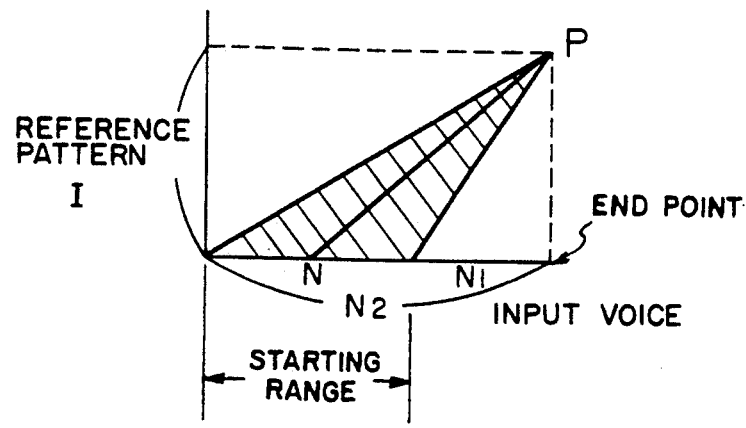

In calculating the distance between an unknown input of length N and a reference pattern, the unknown input is adjusted by formula (19) to have the reference pattern length in the manner shown in FIG. 4. The diagram shows the input length on the horizontal axis and the reference pattern length on the vertical axis An input length within the range of N1-N2 permits a straight line having its end point located at the common point P and its start point located at a point N (N1≦N≦N2) on the input axis to serve as a matching route between the input and the reference pattern. Accordingly, the distance calculation takes place only for points inside the triangle indicated by hatching Suppose an unknown input with a duration of $N_U$ carries a voice word k (the end point of the unknown input is fixed, while the start point is unknown, therefore $N_U$ is also unknown). The unknown input is compared with the reference pattern Sk of the word k by shifting the position N, frame by frame, from N1 to N2 so that the time length is adjusted to I using formula (19), and then the distance between the unknown input parameter and the reference parameter is evaluated. Since the reference pattern is Sk, if the input voice word has been spoken correctly, the distance should be minimum at $N=N_U$. Also the distance value should be smaller for the reference pattern Sk than for any other reference pattern Sk'. In this way, the start point of the unknown input (and thus the voice word length) is determined, and at the same time the voice word k is recognized.

Figure 5:
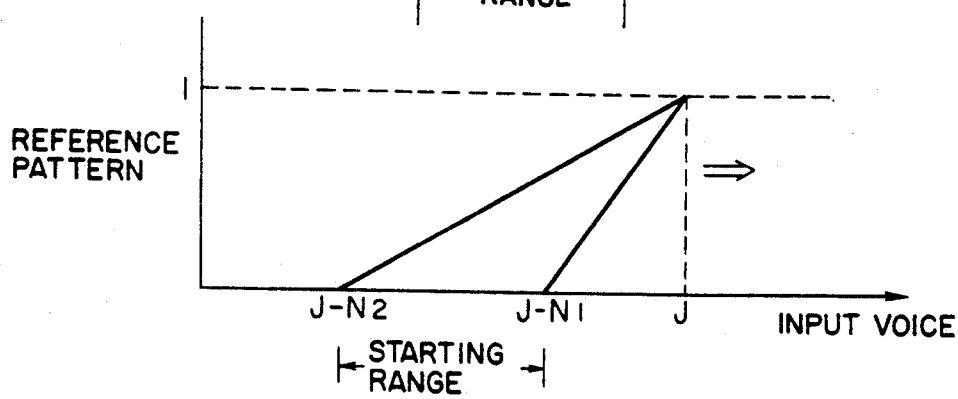

Although the end point is fixed in FIG. 4, this method can be expanded to deal with the case in which both the start and end points are unknown (i.e., the period of the voice word is unknown). FIG. 5 is used to explain this case. In the figure, the end point has a coordinate j on the horizontal axis (input time axis). If the position of j were to be coincident with the end point of the input voice word, this would be the same case as FIG. 4, but this is the case with the assumption that both points are unknown and therefore the position j is not necessarily coincident with the voice word ending point. However, by scanning a range $j1 \leq j \leq j2$ wide enough to cover the voice word range, the time point of $j=j0$ at which the coordinate j coincides with the end point will surely be found. In this case, the start point should be found at point $j0-N_U$ within the range from $j0-N2$ to $j0-N1$. Also in this case of scanning, a smaller distance will be reached when the start point is located at $j0-N_U$ and the end point at $j0$ than any other combination of j and N, in response to the coincidence of the spoken word with the reference pattern. At the same time, this distance value is smaller than that for any other reference pattern. Accordingly, the recognition result is reached and at the same time the start and end points of the voice word are determined.

The method shown in FIG. 5 is capable of voice recognition by slicing a portion most resembling the reference pattern out of the signal in which the voice word is mixed with noises. It does not need a complex procedure for detecting the voice word range, as used commonly in the art, but instead the voice word range is yielded together with the recognized word.

The distance is calculated by a statistical distance scale (a distance based on posterior probability) using a time-series pattern of characteristic parameters, as will be described in the following. While the following mathematical treatment employs the principles that were discussed above in conjunction with the first embodiment, it should be noted that the mathematical symbolism has been modified. For characteristic parameters that are D in number for a frame, the time-series pattern of a frame becomes a-vector of D-by-I dimensions. For an unknown input having i-th frame parameters $|X_i$ and for a reference pattern of a word k having i-th frame components $a_i^k$, $$|X_i = (x_{1,i}, x_{2,i}, \ldots x_{d,i}, \ldots x_{D,i}) \quad (20)$$

$$a_i^k = (a_{1,i}^k, \ldots a_{d,i}^k, \ldots a_{D,i}^k) \quad (21)$$

Time-series patterns $|X$ and $|A_k$ are given as, $$|X = (|X_1 |X_2, \ldots, |X_i, \ldots, |X_I) \quad (22)$$

$$|A_k = (a_1^k, a_2^k, \ldots, a_i^k, \ldots, a_I^k) \quad (23)$$

Equation (22) corresponds to equation (9) when cepstrum coefficients are used as parameters.

The distance $L_k$ for the word k is calculated by the statistical distance measure:

$$L_k = B_k - |A_k^t \cdot |X \quad (24)$$

$$= B_k - \sum_{i=1}^{I} (a_i^k)^t \cdot |X_i \quad (25)$$

$$= B_k - \sum_{i=1}^{I} \left( \sum_{d=1}^{D} a_{d,i}^k \cdot x_{d,i} \right) \quad (26)$$

where $|A_k$ and $B_k$ are the reference patterns of the word k.

$$|A_k = 2 |W_a^{-1} (|U_k - |U_e) \quad (27)$$

$$B_k = |U_k^t \cdot |W_a^{-1} \cdot |U_k - |U_e^t \cdot |W_a^{-1} \cdot |U_e \quad (28)$$

where $|U_k$ is the average vector for the word k, and $|U_e$ is the average vector of peripheral or surrounding information or such for all words. $|W_a$ is the covariance matrix, which can be produced by using the covariance matrices $|W_k$ for all words and the covariance matrix $|W_e$ of peripheral information.

$$|W_a = \left( \sum_{k=1}^{K} |W_k + |W_e \right) / (K + 1) \quad (29)$$

where K represents the variety of words.

Figure 6:
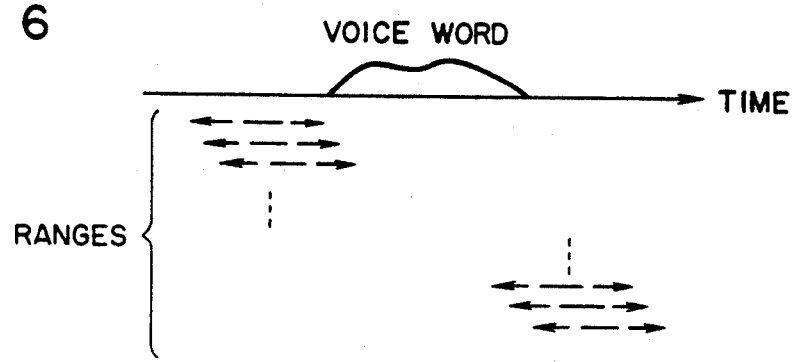
FIG. 6 is a diagram used to explain the reference pattern generation for the peripheral information according to the second embodiment.

The vector $|U_e$ and the covariance matrix $|W_e$ are produced using numerous samples for each word in the following manner. As shown in FIG. 6, a plurality of ranges (each having an I-frame length) is set by shifting the position, frame by frame, so as to cover the voice word and its peripheral or surrounding portions. This operation is repeated for many samples for each word, and the moving average vector $|U_e$ of parameters and moving covariance matrix $|W_e$ for these ranges are produced.

Since equation (24) has the same form as equation (11), the number of calculating operations to obtain the distance is identical to the case of the first embodiment. The only differences are in equations (27) and (28), in comparison with previous equations (12) and (13), for producing the reference patterns. A feature of this embodiment is the inclusion of peripheral information as $|U_e$ and $|W_e$ in the reference patterns. This causes equation (24) to be distance based on pseudo posterior probability.

In FIG. 2, reference number 10 denotes an A/D converter for converting an input signal into a digital signal, 11 denotes an acoustic analyzer for analyzing each analysis range (frame), and 12 denotes a characteristic parameter extractor which provides six low-order LPC cepstrum coefficients (C0–C5) at every frame interval (10 ms). The output of the characteristic parameter extractor 12 corresponds to $|X_i$ in equation (20) (therefore D=6). Blocks 10, 11 and 12 have the same functions as the blocks 1, 2 and 3, respectively, in FIG. 1. Besides LPC cepstrum coefficients, the characteristic parameters could be autocorrelation coefficients, PARCOR coefficients, or the output of a band-pass filter.

Figure 7:
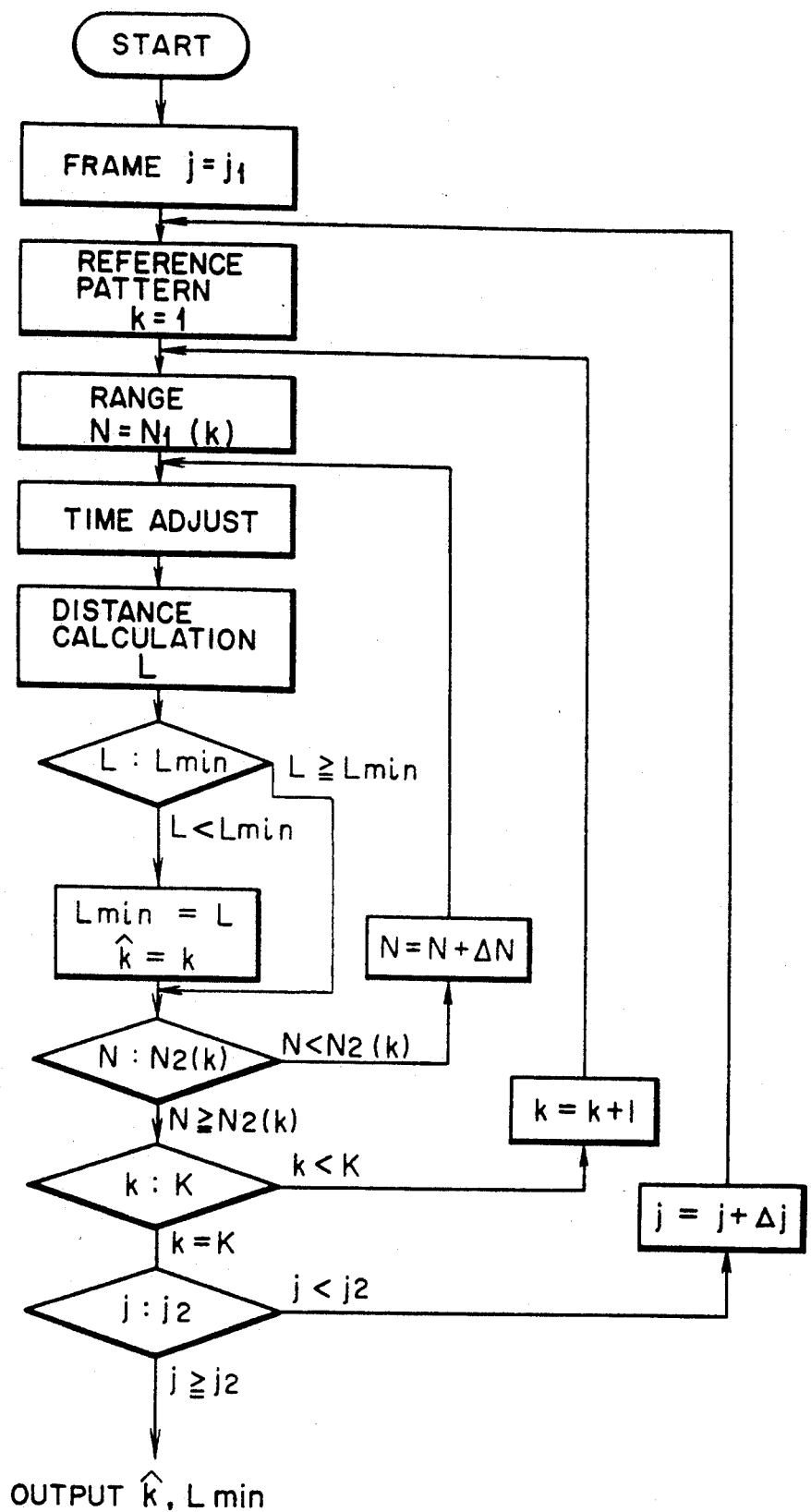
FIG. 7 is a flowchart explaining the processing of the second embodiment.

The functions of these blocks will be described with reference to the flowchart in FIG. 7. A frame synchronizing signal generator 13 generates a synchronizing signal for each frame. The distance calculation is carried out in a range $j1 \leq j \leq j2$ which is wide enough to cover the input voice word, where j represent the frame number. In a 1-frame period, the following operations take place. A reference pattern selector 18 selects candidate voice words (K in number) one by one. A candidate range setter 15 sets a minimum word length N1(k) and a maximum word length N2(k) for each selected reference pattern. For the range length of $(N1(k) \leq N \leq N2(k))$, input parameters obtained by the characteristic parameter extractor 12 (corresponding in number to frames j - N to j) are aligned to form a time-series input pattern. The time width of the input pattern is adjusted to I frames in accordance with formula (19) by a time-axis normalizer 14 so that a parameter series corresponding to equation (22) is obtained. A distance calculator 16 uses equation (24) to calculate the distance $L_k(N)$ between this parameter series and a reference pattern $A_k$, $B_k$ selected by the reference pattern selector 18 in a reference pattern storage 17. A distance comparator 20 compares $L_k(N)$ with the minimum distance Lmin which has been detected up to this point and stored in a temporary storage 19. If $L_k(N) <$ Lmin then Lmin is replaced by $L_k(N)$ to update the temporary storage 19, with the k being updated to R, or if $L_k(N) \geq$ Lmin then the temporary storage 19 is left unchanged.

This series of operations is conducted $N2(k) - N1(k) + 1$ times for each of K reference patterns during a 1-frame period. The operation is repeated for frames j1 through j2. The recognition result is provided as $\hat{k}$ when frame j2 is reached, and the resemblance at this time point corresponds to the minimum distance Lmin. By holding the frame $\hat{j}$ and period length $\hat{N}$ at the time point of minimum distance in the temporary storage 19, the voice word period can be obtained as a result.

As described above, this embodiment allows voice recognition without the need for voice range detection, but merely through the provision of the ranges from j1 to j2 wide enough to cover the input voice word. The second embodiment shown in FIG. 2 is easy to understand and is useful for explaining the method, and yet it can be realized straight away. However, if it is intended to practice this method on a real-time basis, this method is disadvantageous since it requires too many calculation operations. The reason is that the calculation of equation (24) is fully implemented for all ranges set by the candidate range setter 15.

The following third embodiment of this invention is a more practical method in which the number of calculations is reduced. Acquisition of a recognition result is by obtaining $k = \hat{k}$ for minimizing $L_k$ in equation (25). Namely, $$\min L_k = \min \left( B_k - \sum_{i=1}^{I} (a_i^k)^t \cdot |X_i| \right)$$

$$= B_k - \max \left( \sum_{i=1}^{I} (a_i^k)^t \cdot |X_i| \right) \quad (30)$$

$$= B_k - \max \left( \sum_{i=1}^{I} l_i^k(N) \right) \quad (31)$$

$$= B_k - \max M_k(N) \quad (32)$$

where $l_i^k(N) = (a_i^k)^t \cdot |X_i|$ (33)

The last equation (33) gives the partial distance between the reference pattern $\underline{k}$ and the input $|X_i|$ of the i-th frame after the time adjustment in accordance with the matching route N. The meaning of time adjustment will be reviewed in the following. Supposing an unknown input to have a vector $|Y|$ prior to the time adjustment, it is expressed as follows.

$$|Y| = |Y_1, |Y_2, \ldots, Y_n, \ldots Y_N) \quad (34)$$

Both $\underline{n}$ and $\underline{i}$ are integers in the relationship of expression (19). Accordingly, the vector X in equation (22) is a time-sequential list of frames, I in number, selected via expression (19) from the unknown input vector $|Y|$ given by equation (34). The selecting operation in accordance with the matching route is expediently expressed as follows.

$$|X_i = [[|Y_i]]_N \quad (35)$$

The partial distance of equation (33) becomes, $$l_i^k(N) = (a_i^k)^t \cdot [[|Y_i]] \quad (36)$$

The sum of partial distance $M^k(N)$ is expressed as, $$M_k(N) = \sum_{i=1}^{I} l_i^k(N) = \sum_{i=1}^{I} (a_i^k)^t \cdot [[y_i]]_N \quad (37)$$

Namely, equation (24) can be substitutd by the operation of summing partial distance $l_i^k(N)$, which have been obtained in advance, for I frames in compliance with the expression (19). The relation between $\underline{i}$ and $\underline{n}$ can be obtained uniquely from expression (19) by giving N, and it can be calculated in the range of $N1 \leq N \leq N2$ and stored in a table in advance.

Figure 8:
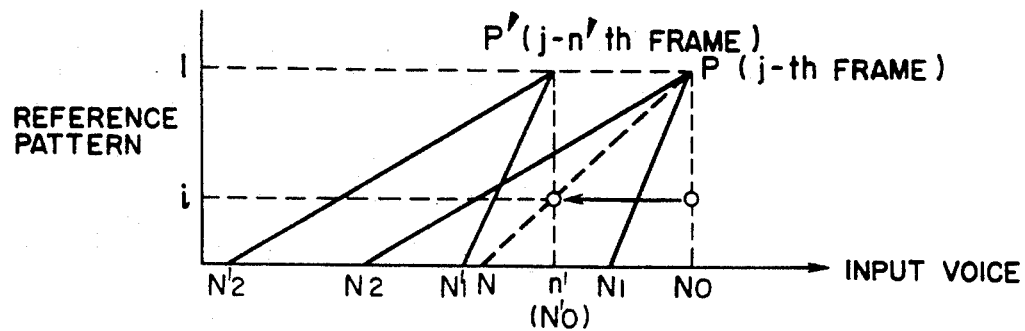
FIG. 8 is a diagram used to explain the determination of the partial distances according to a third embodiment of this invention.

Next, the acquisition of $l_i^k(N)$ will be described with reference to FIG. 8. In the figure, point P is the end point for a reference pattern and an unknown input, and its coordinate is $N_O$. N1 and N2 define the minimum length and maximum length of the voice word, as in the previous case. For an unknown input having a start point N, the matching route is denoted by a dotted line PN. On the line PN, the partial distance $l_i(N)$ at an arbitrary point (n', i) in compliance with expression (19) is the product of the vector of frame n' of the input and the vector $a_i$ of the frame $\underline{i}$ component of the reference pattern. The point (n', i) is currently located on the line PN, but since the P point o shifts with time, it should have been located on a line P'No' at a time preceding the present by n' frames. Therefore, it is possible to obtain and hold the partial distance at a point (n', i) at a time point P' and to use it at a later time point P. Since (n', i) is an arbitrary point in the triangle $PN_2N_1$, other points can be treated the same way. Based on this idea, the calculation for each frame can be divided into two parts as follows.

1. Calculation for sum-of-products: Partial distances on the line $PN_o$ are calculated and stored in a buffer.
2. Calculation for addition: The calculation of the sum of partial distances by equation (37) uses partial resemblances $l_i^k(N)$ which have been calculated in previous frames and stored in the buffer.

Figure 9:
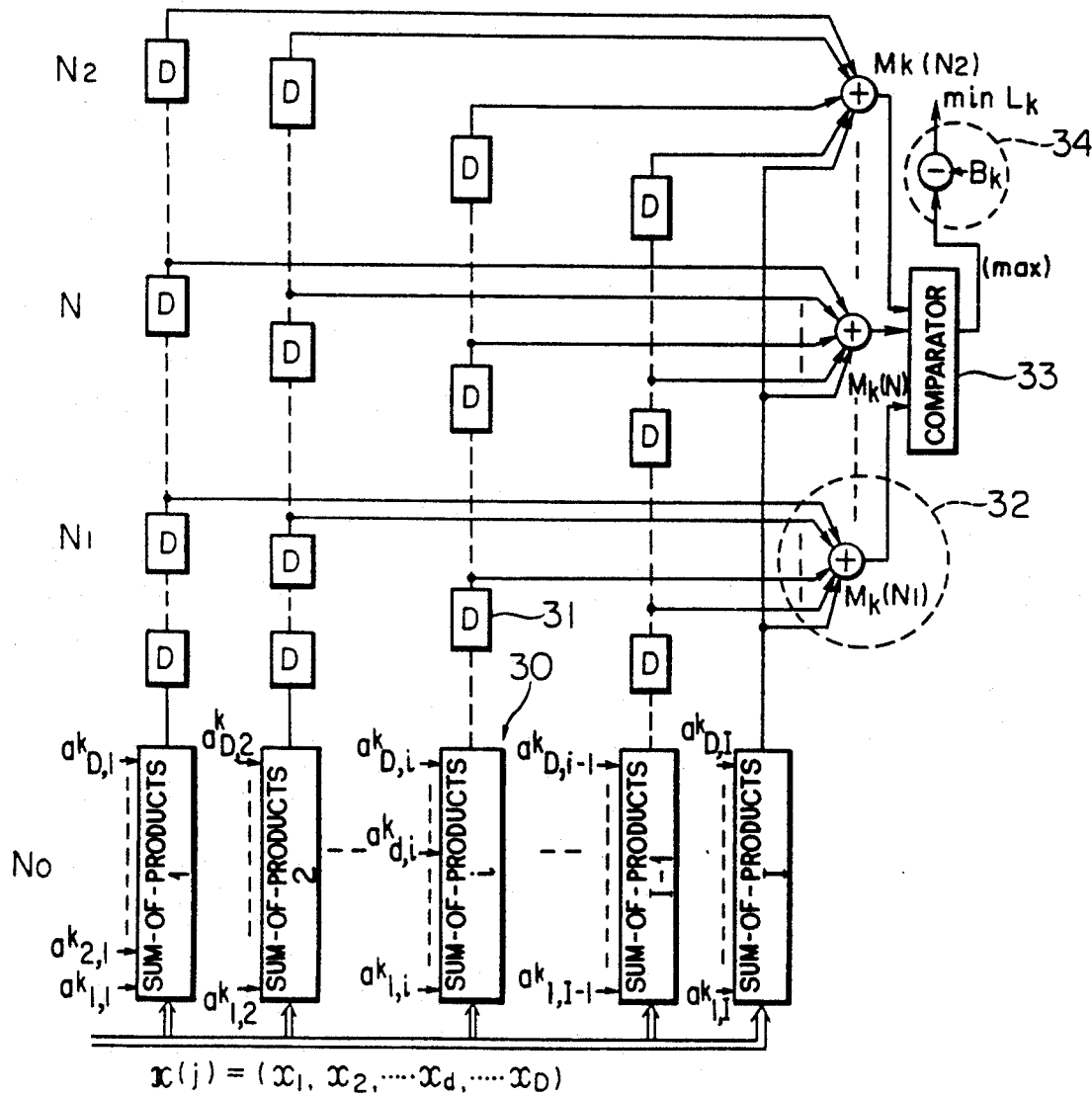
FIG. 9 is a block diagram showing the calculations for each frame according to the third embodiment.

FIG. 9 is a block diagram showing the method of calculation for each frame. In the figure, reference number 30 denotes sum-of-products operators for calculating $l_i^k(N_o)$, and they are provided equal in number to the number (I) of frames of the reference pattern. Each operator receives at the bottom an input vector $|X(j)$ of the j-th frame and also receives a reference pattern at the left side. The operator calculates equation (36) to produce $l_i^k(N_o)$. Delay buffers 31 are provided, each of which holds the calculation result from an operator (30) for a 1-frame period and propagates it to the next stage buffer. The number of delay buffers provided is equal to the number of points in the $\Delta PN_2N_0$ in FIG. 8 for a word. Reference number 32 denotes an adder, which calculates equation (37) to provide the sum of distances. The adder 32 has input terminals that are I in number, each connected to the output of a delay buffer in accordance with the matching route stated by expression (19). Further provided are a comparator 33 for finding the max $M_k(N)$, and a subtracter 34 for calculating equation (32) to find the minimum value for the word $\underline{k}$. These steps comprise the method of the third embodiment.

Figure 10:
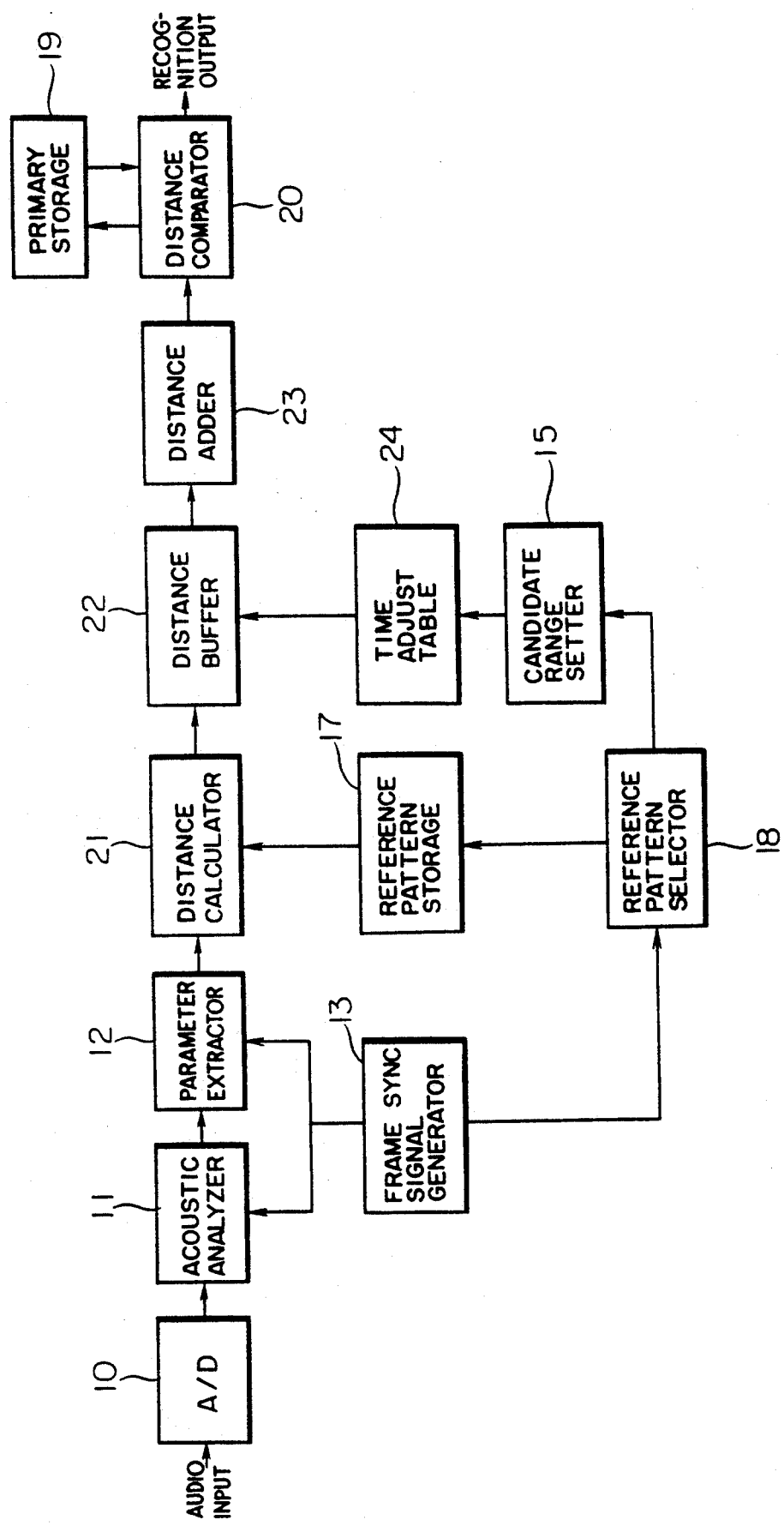
FIG. 10 is a functional block diagram showing the third embodiment of the inventive voice recognition method.

FIG. 10 is a functional block diagram showing the voice recognition system according to the third embodiment of this invention. In FIG. 10, functional blocks referred to by the same symbols as used in FIG. 2 are identical, and their explanation will be simplified or omitted completely in the following description.

In FIG. 10, an A/D converter 10, an acoustic analyzer 11 and a characteristic parameter extractor 12 operate in unison to quantize the input voice word, and implement LPC analysis so as to produce characteristic parameters (LPC cepstrum coefficients) for each frame. The following operations take place in a 1-frame period. The reference pattern selector 18 selects reference patterns (K in number) stored in the reference pattern storage 17 on a one-by-one basis. A partial distance calculator 21 calculates equation (36) for the input characteristic parameters and the selected reference pattern, and stores the resultant values $l_i^k(N_o)$ in the distance buffer 22. The distance buffer 22 has a capacity to store the distance data within the $\Delta PN_2N_0$ in FIG. 8 for one word, and it is read out by being addressed by a time adjustment table 24. The table 24 describes the relation between $\underline{n}$ and $\underline{i}$ stated by expression (19) for each input length N (N1≦N≦N2). N1 and N2 are set by the candidate range setter 15 separately for each word. A distance adder 23 calculates equation (37) for each of the matching routes N1 through N2 by adding the outputs of the buffer 22 addressed by the time adjustment table 24, and produces the sum of distances $M_k(N)$. The distance comparator 20 compares $M_k(N)$ with the contents of the temporary storage 19 and replaces the content with $M_k(N)$ only when $M_k(N)$ is the larger. Upon completion of calculation up to N=N2, Lk is evaluated by equation (25), and it is compared with a minimum value at that time point stored in the temporary storage 19, and Lk replaces the content of the temporary storage 19 only when it is the smaller. The reference pattern selector 18 selects the next word and implements the same operations. Upon completion of all words, the frame is advanced.

Through the foregoing operations for all periods (j=j1 to j2) concerned, the minimum value $L_k$ of distance and an associated word $\hat{k}$ are obtained as a result of recognition at the end of frame j=j2.

The third embodiment considerably reduces the number of sum-of-products operations for evaluating the distance, as compared with the second embodiment. In a specific case with the number of words being K=10, the reference pattern being length I=16, the average minimum time length being N1=21, the average maximum time length being N2=40, and the number of parameters for a frame being D=6, the number of sum-of-products operations needed by the third embodiment is 960, against 19,800 needed by the second embodiment.

The method of this embodiment was tried for the ten numeric words in Japanese, spoken through the telephone by a total of 330 adult men and women, with a resulting average recognition rate of 93.75%. Considering the noisy environment in which the words were spoken, this rate is not too bad. An analysis of erroneous recognitions by this embodiment revealed that the most of the errors occurred due to recognizing part of a word as another word. For example, in receiving "zero", the portion "ro" might be erroneously recognized as "go" (Japanese for "five"). If second candidates are included when correct recognition results are counted, the recognition rate is 97% or higher. It is easy to presume that the recognition rate for the first candidate can be enhanced by a little aid from another method.

In summary, a reference time point is provided within the input signal range, which covers a voice word to be recognized and noises preceding and following the word. Two periods of N1 frames and N2 frames (N1<N2) are set starting from the reference point, and these periods are considered to be the minimum and maximum values for the voice word range. Matching is tried between each of a plurality of candidate voice ranges (N2−N1+1 in number) and the reference pattern for each word while adjusting the length of the voice range to a certain time length or number of frames thereby to obtain the distance with each word. These operations are repeated while moving the reference point in the entire input signal range from the beginning to the end. The distances of all candidate voice ranges for all reference point positions are compared, and the word which provides the minimum distance is outputted as the recognition result. The method does not require the detection of the voice range, but is capable of voice recognition by slicing only the voice word section out from a signal in which the voice word is mixed with noises. In contrast with a conventional method in which the voice range is detected using a complex rule (and even in such a case the voice range may be erroneously detected if the noise level is high or transitional noises are included, resulting in a failure of recognition), the present invention simplifies the system by eliminating the complex algorithm for voice range detection and ensures a stable recognition rate for a high-noise input.

Figure 11:
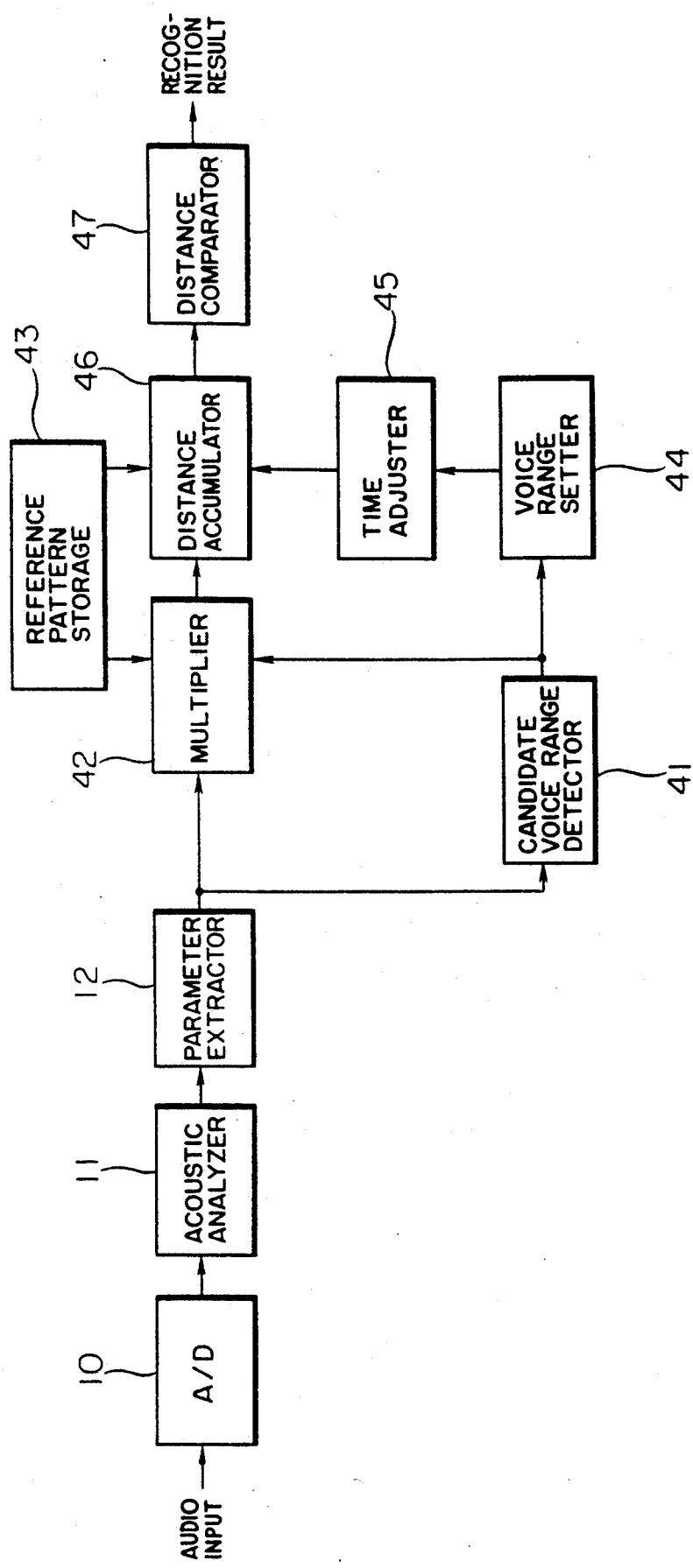
FIG. 11 is a functional block diagram showing a fourth embodiment of the inventive voice recognition method.

FIG. 11 shows the fourth embodiment of this invention. In the figure, the A/D converter 10, acoustic analyzer 11 and characteristic parameter extractor 12 function identically to the embodiment shown in FIG. 1, and their explanation will be omitted.

Figure 12:
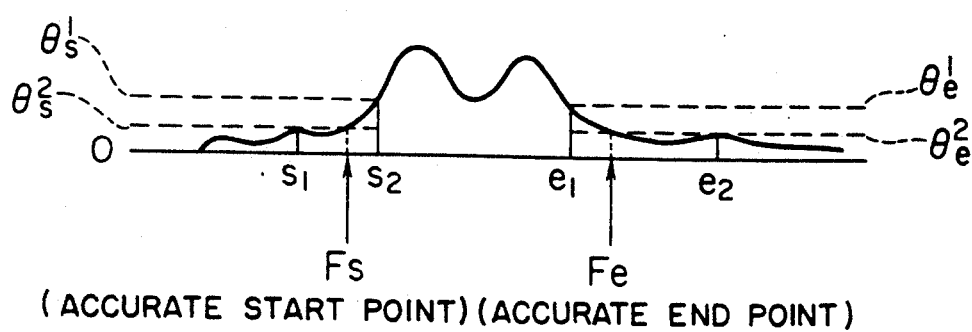
FIG. 12 is a diagram showing the determination of candidate voice ranges.

The function of the candidate voice range detector 41 will now be described. In FIG. 12, the threshold values $\Theta_s^1$ and $\Theta_s^2$ ($\Theta_s^1 > \Theta_s^2$) for detecting the start point and the threshold values $\Theta_e^1$ and $\Theta_e^2$ ($\Theta_e^1 > \Theta_e^2$) for detecting the end point are preset. The values $\Theta_s^1$ and $\Theta_e^1$ are set higher so that no more than the voice range will be included, and the values $\Theta_s^2$ and $\Theta_e^2$ are set lower so that the voice range will not be missed. As shown in FIG. 12, these threshold values are compared to the logarithmic power (LWo) of the input voice signal to define the first frame above the threshold $\Theta_s^2$ to be $S_1$, the first frame above the threshold $\Theta_s^1$ to be $S_2$, the last frame below the threshold $\Theta_e^1$ to be $e_1$, and the last frame below the threshold $\Theta_e^2$ to be $e_2$. Accordingly, an accurate start point Fs is found such that $S_1 \leq Fs \leq S_2$, and an accurate end point Fe is found such that $e_1 \leq Fe < e_2$. In practice, the positions of $S_1$, $S_2$, $e_1$ and $e_2$ are modified by a rule in view of the continuity of the logarithmic power LWo.

Figure 13:
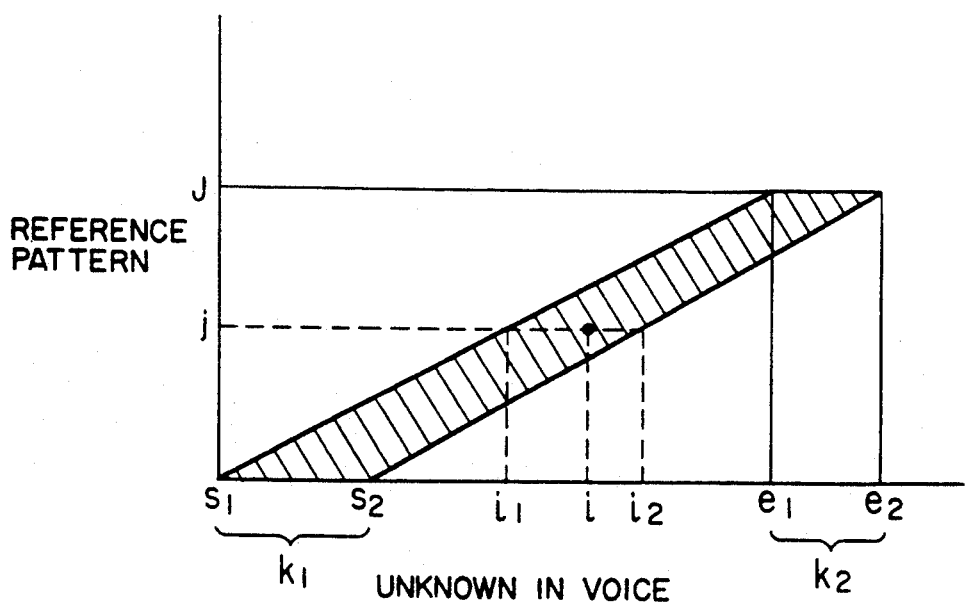
FIG. 13 is a diagram showing the correlation on the time axis between an unknown input and a reference pattern according to the fourth embodiment of the inventive voice recognition method.

The candidate voice range detector 41 provides the candidate start point ($S_1$ through $S_2$) and the candidate end points {$e_1$ through $e_2$} for the unknown input voice word. With a reference pattern having I frames, the time correspondence in the matching process between an unknown input signal and a reference pattern is as shown in FIG. 13, where the unknown input is given the horizontal time axis, and the reference pattern is given the vertical time axis. The origin is set to $S_1$, which is also the start point of the reference pattern.

Placing $m_1 = S_2 - S_1 + 1$ and $m_2 = e_2 - e_1 + 1$, there are a plurality of possible voice ranges ($m_1$ by $m_2$ in number) for the unknown input, and all of the time correspondences (matching routes) between the voice ranges and the reference pattern are included within the hatched parallelogram in FIG. 13. Distance calculations by equation (11) are needed only for points within this region, and the partial products obtained by developing equation (11) between frames of the unknown input and the reference pattern can be calculated in advance for the points within this region. Thereafter only the necessary partial products are selected for addition when time time length is adjusted.

A partial vector $IA_i^{(k)}$ for the i-th frame of a reference pattern for a word $\underline{k}$ is expressed as follows.

$$IA^{(k)}_i = (a_{i,0}, a_{i,1}, a_{i,2}, \ldots, a_{i,p}) \tag{38}$$

A partial vector $IX_j$ for the j-th frame for an unknown input x given by equation (9) is expressed as follows.

$$IX_j = (C_{j,0}, C_{j,1}, C_{j,2}, \ldots, C_{j,p}) \tag{39}$$

As shown in FIG. 13, frames of the unknown input subjected to the distance calculation with the i-th frame of the reference pattern are in the range of $j_1 \leq j \leq j_2$. The limit of the slope gives.

$$j_1 = [e_1/I + 0.5] \tag{40}$$

$$j_2 = [(e_2 - s_2) \cdot i/I + s_2 + 0.5] \tag{41}$$

From equation (11), the partial product $$q_{i,j}^{(k)}$$

of the distance with the word $\underline{k}$ at a lattice point (i,j) is expressed as, $$IX_j q_{i,j}^{(k)} = IA_j^t \cdot {}^{(k)}_i \tag{42}$$

The suffix t indicates the product to be a transposed vector.

The multiplier 42 shown in FIG. 11 calculates partial products $$i = \left[ \frac{J_l - I}{J_l - 1} \cdot j_l + \frac{J_l - I}{J_l - 1} + 0.5 \right] \tag{43}$$

in the range $j_1 \leq j \leq j_2$ between the unknown input provided by the characteristic parameter extractor 12 and a reference pattern stored in the reference pattern storage 43, and temporarily holds the results for each word.

The voice range setter 44 makes combinations of the start points and end points detected by the candidate voice range detector 41, and sets voice ranges that are $L = m_1 \times m_2$ in number. The voice ranges are numbered by l (l = 1, 2, ..., L). The time axis adjuster 45 adjusts the length $J_l$ of the l-th voice range to the reference pattern length I by the following equation derived from equation (8).

$$q_{i,j l}^{(k)}$$

Because of $j_1 \leq j_l \leq j_2$, the partial product $$q_{i,j l}^{(k)}$$

for the coordinate (i, $j_l$) should have been already produced by the multiplier 42. A distance accumulator 46 sums up partial products between an unknown input and each reference pattern for each voice range l. Letting the cumulation up to the i-1 th frame be represented by $$Q_{i-1}^{(k)} (l),$$

the cumulation $Q^{(k)}_i$ (l) up to the i-th frame is given as, $$Q_i^{(k)} (l) = Q_{i-1}^{(k)} (l) + q_{i,j l}^{(k)} \tag{44}$$

The initial condition is given in advance as $Q_0^{(k)} (l) = 0$.

The multiplier 42, time axis adjuster 45 and distance accumulator 46 operate in unison as mentioned above for i = 1, 2, ..., I, and $Q^{(k)}_i(l)$ at the stage of i=I can be obtained. The quantity $Q_I^{(k)} (l)$ is equivalent to $a_{k^l} \cdot \mathfrak{C} x$ in equation (11). Accordingly, the distance $D_k^l$ between the unknown input $x^l$ of the l-th voice range and the reference can be obtained using $B_k$ stored in the reference pattern storage 43, as follows.

$$D_k^l = B_k - Q_I^{(k)} (l) \tag{45}$$

The distance comparator 47 compares $D_k^l$ for all voice ranges l=1 to L and all reference patterns k=1 to K, and outputs the voice word corresponding to the reference pattern providing the minimum distance $D^l_k$ as the voice recognition result.

Next, the effectiveness of this embodiment will be described. As is apparent from the foregoing description, this embodiment is intended to speed up the process by reducing the number of multiplying operations. For the number of parameters $\underline{d}$ for a frame, the normalized frames I, the number of voice ranges L and the number of words K, the method of the first embodiment needs $\underline{d}$ by I by L by K multiplying operations, whereas the method of this embodiment reduces the number to $\underline{d}$ by I by K by $(m_1+m_2)/2$, i.e., reduces the multiplying operations by $$\frac{m_1 + m_2}{2 m_1 m_2}$$

times. The number of adding and substracting operations by this embodiment are comparable with the method of the first embodiment. Since each multiplying operation takes much more time than addition or subtraction when the system is constructed using a microcomputer or the like and fast multiplication requires a complex circuit, the effectiveness of this embodiment is obvious.

It is of course possible for this embodiment to employ LPC cepstrum coefficients, autocorrelation coefficients, or the output of a band-pass filter as the characteristic parameters.

This embodiment can be summarized as follows. Candidate starting ranges and ending ranges which include accurate start and end points are detected in an input voice word. Partial products between partial vectors of each frame of a reference voice word pattern and part of the unknown input signal are calculated in advance for all ranges defined by the candidate starting and ending periods. Corresponding partial products equal in number to the number of frames of the reference pattern are selected for each voice range and accumulated so as to obtain the distance between the input vector and the reference voice word pattern. Consequently, the number of multiplying operations can be reduced significantly and the speed-up of the process can be achieved.

Although the term "distance" has been used in describing the foregoing embodiments, another term,'-'resemblance," could have been used instead. In this case, however, words such as "minimum" and "smaller" would be replaced by "maximum" and "higher" (that is, the input vector with the minimum distance to a reference word pattern has the maximum resemblance to the reference word pattern).

I claim:

1. A voice recognition method comprising the steps of:
   (a) predetermining reference word patterns for a plurality of target voice words such that each target voice word is represented by a respective one of said reference word patterns, each of said reference word patterns having $D \times I$ parameters, where I represents a predetermined number of frames, each frame having a constant time length, and D represents a predetermined number of parameters included in each frame;
   (b) analyzing an input voice signal every frame to obtain D parameters for each frame of the input voice signal;
   (c) detecting start and end frames from the input voice word signal to determine a voice range from the start frame to the end frame;
   (d) finding a time-series vector having $D \times I$ parameters by expanding or compressing the voice range, regardless of its length, to I frames, each frame of the expanded or compressed voice range having the parameters that were obtained in step (b);
   (e) using a statistical distance scale to calculate the distance between said input time-series vector and each of said reference word patterns;
   (f) determining which of said reference word patterns has the smallest distance to said input time-series vector; and
   (g) identifying which target voice word corresponds to the reference word pattern having said smallest distance.

2. A voice recognition method according to claim 1, wherein said statistical distance scale comprises any one of Mahalanobis' distance, Bayes' discriminant, and a linear discriminant function.

3. A voice recognition method according to claim 1, wherein said parameters comprise any one of LPC cepstrum coefficients, autocorrelation coefficients, and band-pass filter outputs.

4. A voice recognition method according to claim 1, wherein step (a) comprises, for each reference word, the steps of collecting a plurality of samples of a respective target voice word, analyzing each sample of the respective target voice word to produce a plurality of frames each having D parameters, expanding or contracting the number of frames in each analyzed sample to I frames, finding an average vector for the respective target voice word from the analyzed and expanded or contracted samples, the average vector having $D \times I$ parameters, finding a covariance matrix common to all the target voice words, and establishing a reference word pattern for the respective target voice word based on the average vector for the respective target voice word and the covariance matrix.

5. A voice recognition method comprising the steps of:
   (a) predetermining reference word patterns for a plurality of target voice words by using both data relating to said plurality of target voice words and data relating to surrounding information which occurs prior to and subsequent to said target voice words, each reference pattern including a constant number of frames and a constant number of parameters per frame;
   (b) providing an unknown input signal having a variable time length along a time axis and a correspondingly variable number of frames, each frame of said unknown input signal including the same number of parameters as said frames of said reference word patterns, said unknown input signal including an unknown voice word corresponding to one of said target voice words and surrounding information which is different from the surrounding information used in the step (a);
   (c) selecting a reference point along said time axis for said unknown input signal;
   (d) selecting overlapping first and second time ranges along said time axis, said second time range being larger than said first time range, with each of said first and second time ranges having an end point that coincides with said reference point;
   (e) selecting a plurality of analysis ranges between a minimum analysis range corresponding to said first time range and a maximum analysis range corresponding to said second time range;
   (f) expanding or compressing the time length of each of said plurality of analysis ranges to provide the same number of frames that are in each reference word pattern and forming input vectors from such frames and their respective parameters, each input vector corresponding to a respective analysis range;
   (g) using a statistical distance scale established by posterior probability to evaluate the distance between each input vector and each reference work pattern;
   (h) determining the reference word pattern having the minimum distance resulting from the evaluations conducted in step (g), and storing in memory the minimum distance and a reference word pattern name associated with said reference word pattern;
   (i) shifting said reference point selected for said unknown input signal by a unit length along said time axis and repeating steps (d)–(h) to determine a new minimum distance;

(j) comparing said new minimum distance determined in the step (i) with a previously stored minimum distance to determine the smaller value, and replacing the value of the minimum distance in said memory with said smaller value, and storing in said memory the reference word pattern name associated with said smaller value;

(k) repeating steps (d)–(j) until said reference point has ben shifted from one end to the other of a predetermined range in which said unknown voice word is includes along said time axis; and (l) recalling from said memory the reference word pattern name associated with the minimum distance that has been stored, and identifying a voice word in said unknown input voice word by said reference word pattern name.

6. A voice recognition method according to claim 5, wherein:

step (f) includes the step of preparing a correspondence of the expanded or compressed analysis ranges to said reference word patterns, and step (g) includes the steps of preparing and storing in a further memory partial distances between the parameters of each frame of said unknown input signal and each of said reference word patterns, reading said partial distances sequentially from said further memory by referring to said correspondence, and adding the partial distances read from said further memory.

7. A voice recognition method according to claim 5, wherein said parameters comprise any one of LPC cepstrum coefficients, antocorrelation coefficients, and band-pass filter outputs.

8. A voice recognition method according to claim 5, wherein in the step (a) each of said reference word patterns is produced statistically from numerous data samples by using, for each of said numerous data samples, information in a range from $l_1$ frames before an accurate start point of a respective one of said target voice words within its respective surrounding information to $l_2$ frames after an accurate end point of said respective one of said target voice words within its respective surrounding information.

9. A voice recognition method according to claim 5, wherein a reference pattern for a target voice word k is produced by eliminating the surrounding information from a reference pattern produced statistically using data attributed to said target voice word k.

10. A voice recognition method according to claim 5, wherein step (g) comprises using a first-order discriminant function to evaluate the distances.

11. A voice recognition method according to claim 5, wherein step (a) comprises, for each reference word, the steps of collecting a plurality of samples of a respective target voice word, analyzing each sample of the respective target voice word to produce a plurality of frames each having D parameters, expanding or contracting the number of frames in each analyzed sample to I frames, finding an average vector for the respective target voice word from the analyzed and expanded or contracted samples, the average vector having $D \times I$ parameters, finding a covariance matrix common to all the target voice words, and establishing a reference word pattern for the respective target voice word based on the average vector for the respective target voice word and the covariance matrix.

12. A voice recognition method according to claim 5, wherein step (f) is conducted without changing the parameters of the frames.

13. A voice recognition method comprising the steps of:

(a) predetermining reference word patterns for a plurality of target voice words by using both data relating to said target voice words, and data relating to surrounding information which occurs immediately prior to and immediately subsequent to said target voice words, each reference word pattern including I frames and D parameters per frame;

(b) providing an unknown input signal which has a variable time length along a time axis, and which contains an input voice word;

(c) detecting candidate starting ranges and candidate ending ranges from along said time axis of said unknown input signal;

(d) setting analysis ranges equal in number to the multiplication product of the number of said candidate starting ranges and the number of said candidate ending ranges;

(e) expanding or compressing at least some of said analysis ranges to provide I frames for each expanded or compressed analysis range;

(f) extracting D parameters from each frame of said expanded or compressed analysis ranges, and aligning the extracted characteristic parameters along said time axis to form input vectors having $D \times I$ parameters;

(g) comparing and collecting distances between said input vectors and each of said reference word patterns by using a statistical distance scale based on posterior probability so as to initially produce all partial products between D-dimensioned partial vectors of said reference word patterns and D-dimensioned partial vectors of said unknown input signal for each frame within ranges defined by said candidate starting ranges and said candidate ending ranges, and by then producing the distance for each comparison by selecting partial products corresponding to each analysis range and accumulating the selected partial products equal in number to said number of frames I of a reference word pattern;

(h) repeating step (g) for each of L analysis ranges;

(i) comparing N-by-L distances; and (j) identifying a voice word corresponding with the reference word pattern having the minimum distance.

14. A voice recognition method according to claim 13, wherein said step of accumulating the selected partial products comprises selecting partial products corresponding to frames of an unknown input signal which is determined through linear adjustment for a voice range length of said unknown input signal to a reference pattern length.

15. A voice recognition method according to claim 13, wherein said parameters comprises any one of LPC cepstrum coefficients, autocorrelation coefficients, and band-pass filter outputs.

16. A voice recognition method according to claim 13, wherein said surrounding information is produced statistically from numerous data samples attributed to all target word using information from a range along said time axis which extends from a plurality of frames before an accurate start point of a target voice word to a plurality of frames after an accurate end point of the respective target voice word.

17. A voice recognition method according to claim 13, wherein a reference pattern for a target voice word k is produced by eliminating the surrounding information from a reference pattern produced statistically using data attributed to said target voice word k.

18. A voice recognition method according to claim 13, wherein step (g) comprises using a first-order discriminant function of posterior probability to evaluate the distances.

19. A voice recognition method according to claim 13, wherein step (a) comprises, for each reference word, the steps of collecting a plurality of samples of a respective target voice word, analyzing each sample of the respective target voice word to produce a plurality of frames each having D parameters, expanding or contracting the number of frames in each analyzed sample to I frames, finding an average vector for the respective target voice word from the analyzed and expanded or contracted samples, the average vector having $D \times I$ parameters, finding a covariance matrix common to all the target voice words, and establishing a reference word pattern for the respective target voice word based on the average vector for the respective target voice word and the covariance matrix.

20. A voice recognition method according to claim 13, wherein step (f) is conducted without changing the parameters of the frames.

21. A voice recognition method for determining which of a plurality of target voice words corresponds to a spoken word of variable duration, said method comprising the steps of:
   (a) generating an input signal from the spoken word;
   (b) sampling the input signal to periodically generate frames;
   (c) for each frame, generating a number D of parameters which provide information about the spoken word;
   (d) using threshold values to detect a sequence of frames from a starting frame for the spoken word to an ending frame for the spoken word;
   (e) adjusting the number of frames in the sequence detected in step (d) to provide an adjusted sequence with a predetermine number I of frames, step (e) being conducted by selectively dropping frames from the sequence detected in step (d) or repeating frames in the sequence detected in step (d) without changing the parameters of the frames;
   (f) forming an input time-series vector from the adjusted sequence, the input vector having $D \times I$ parameters;
   (g) using a statistical distance scale based on posterior probability to find the distances between the input vector and each of a plurality of previously stored reference word patterns which represent the target voice words, each reference word pattern including information about I frames with D parameters per frame; and
   (h) selecting the target voice word represented by the reference word pattern for which the smallest distance was found in step (g).

22. The method of claim 21, wherein step (e) is conducted so that $$i = \left\{ \frac{N-1}{I-1} i + \frac{I-N}{I-1} + 0.5 \right\}$$

wherein there are N frames in the sequence before adjustment, wherein n is the frame number of a frame in the sequence before adjustment, wherein i is the number of frames after adjustment, wherein i is the frame number of a frame after adjustment, and wherein the symbols { } express the largest integer which does not exceed the value enclosed by the symbols.

23. The method of claim 21, wherein the statistical distance scale used in the step (g) is any one of Mahalanobis' distance, Bayes' discriminant, and a linear discriminant function.

24. The method of claim 21, wherein the parameters generated in step (c) comprise LPC cepstrum coefficients, autocorrelation coefficients, or band-pass filter outputs.

25. A voice recognition method for determining which of a plurality of target voice words corresponds to a spoken word of variable duration, the spoken word having first and second ends, said method comprising the steps of:
   (a) generating an input signal from the spoken word;
   (b) sampling the input signal to periodically generate frames;
   (c) for each frame, generating a predetermined number of parameters which provide information about the spoken word;
   (d) selecting a first frame as a candidate for the first end of the spoken word;
   (e) selecting a plurality of second frames as candidates for the second end of the spoken word;
   (f) determining a plurality of candidate frame sequences, each candidate frame sequence including all frames from a respective second frame to the first frame;
   (g) adjusting the number of frames in each candidate frame sequence to provide adjusted candidate frame sequences each having a predetermined number of frames;
   (h) forming candidate input time-series vectors from the adjusted candidate frame sequences;
   (i) finding the ends of the spoken word and simultaneously determining which target voice word corresponds thereto, if the first frame selected in step (d) and one of the second frames selected in step (e) accurately reflect the first and second ends of the spoken word, step (i) including the sub-steps of
      (i-1) finding the distances between each of the candidate input time-series vectors and each of a plurality of previously store reference word patterns which represent the target words, each reference word pattern including information about the same number of frames to which the candidate frame sequences were adjusted in step (g) and about the same number of parameters per frame that were generated in step (c), and
      (i-2) selecting the target voice word represented by the reference word pattern for which the smallest distance was found in sub-step (i-1).

26. The method of claim 25, wherein step (d) further comprises selecting at least one additional first frame as a candidate for the first end of the word, the first frames being adjacent one another, wherein step (f) further comprises finding additional candidate frame sequences, each additional candidate frame sequence including all frames from a respective second frame to said at least one additional first frame, wherein step (g) further comprises adjusting the number of frames in each additional candidate frame sequence to provide additional adjusted candidate frame sequences; and wherein step (h) further comprises forming additional candidate input time-series vectors from the additional adjusted candidate frame sequences, the additional adjusted candidate frame sequences being employed in step (i) along with the adjusted candidate frame sequences.

27. The method of claim 26, wherein step (d) is conducted by selecting a frame having frame power which lies between a pair of threshold powers.

28. The method of claim 25, wherein, if the first frame selected in step (d) and one of the second frames selected in step (e) do not accurately reflect the first and second ends of the spoken word, so that the ends of the spoken word and the target voice word are not found in step (i), step (d) is repeated so that a new first frame adjacent the previous first frame is selected.

29. The method of claim 28, wherein sub-step (i-1) is conducted so that a statistical distance scale based on posterior probability is used to find the distances.

30. The method of claim 25, wherein step (i) comprises multiplying and summing portions of a candidate input time-series vector and portions of a reference word pattern to determine a plurality of partial distances, and storing the partial distances for different lengths of time.

31. The method of claim 25, wherein step (g) is conducted without changing the parameters of the frames.

* * * * *